United States Patent
Hayakawa

(12) 
(10) Patent No.: US 6,205,111 B1
(45) Date of Patent: Mar. 20, 2001

(54) DISK DRIVING APPARATUS FOR RELIABLY CENTERING A METER-LAYER OPTICAL DISK ON WHICH INFORMATION IS RECORDED

(75) Inventor: Tatsuro Hayakawa, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 08/932,833

(22) Filed: Sep. 18, 1997

(30) Foreign Application Priority Data

Sep. 20, 1996 (JP) .................................................. 8-271643

(51) Int. Cl.[7] .............................. G11B 17/03; G11B 25/04
(52) U.S. Cl. ......................................... 369/270; 360/99.12
(58) Field of Search .................................. 369/270, 271; 360/99.03, 99.12

(56) References Cited

U.S. PATENT DOCUMENTS

| | | | |
|---|---|---|---|
| 4,649,531 | * | 3/1987 | Horowitz et al. ..................... 369/270 |
| 4,730,300 | * | 3/1988 | Kamoshita et al. .................. 369/270 |
| 4,747,002 | * | 5/1988 | Takikawa et al. ..................... 360/99 |
| 5,006,945 | * | 4/1991 | Furusawa ........................... 360/99.12 |
| 5,050,159 | * | 9/1991 | Kenmotsu .............................. 369/270 |
| 5,555,233 | * | 9/1996 | Yano et al. ............................ 369/270 |
| 5,761,186 | * | 6/1998 | Mushika et al. ...................... 369/271 |
| 5,796,709 | * | 8/1998 | Ootsuka ................................ 369/271 |
| 5,862,120 | * | 1/1999 | Mukawa ................................ 369/270 |

* cited by examiner

Primary Examiner—Brian E. Miller
Assistant Examiner—Kenneth W. Fields
(74) Attorney, Agent, or Firm—Ronald P. Kananen; Rader, Fishman & Grauer

(57) ABSTRACT

A disk driving apparatus provided by the present invention comprises: a motor; a turntable mounted on the rotational shaft of the motor, the turntable used for mounting and driving into rotation a multi-disk set comprising a plurality of disk plates stuck to each other; and a disk holding mechanism comprising a fixed portion with such a height that only a particular one of the disk plates of the multi-disk set to be mounted on the turntable is brought in contact with the fixed portion, and a movable portion capable of moving in the radial direction of the turntable in contact with the particular disk plate. As a result, even a multi-disk set can be centered at the center of the turntable with a high degree of accuracy by means of a centering mechanism having a simple configuration which can be implemented at a low cost.

9 Claims, 7 Drawing Sheets

F I G. 6
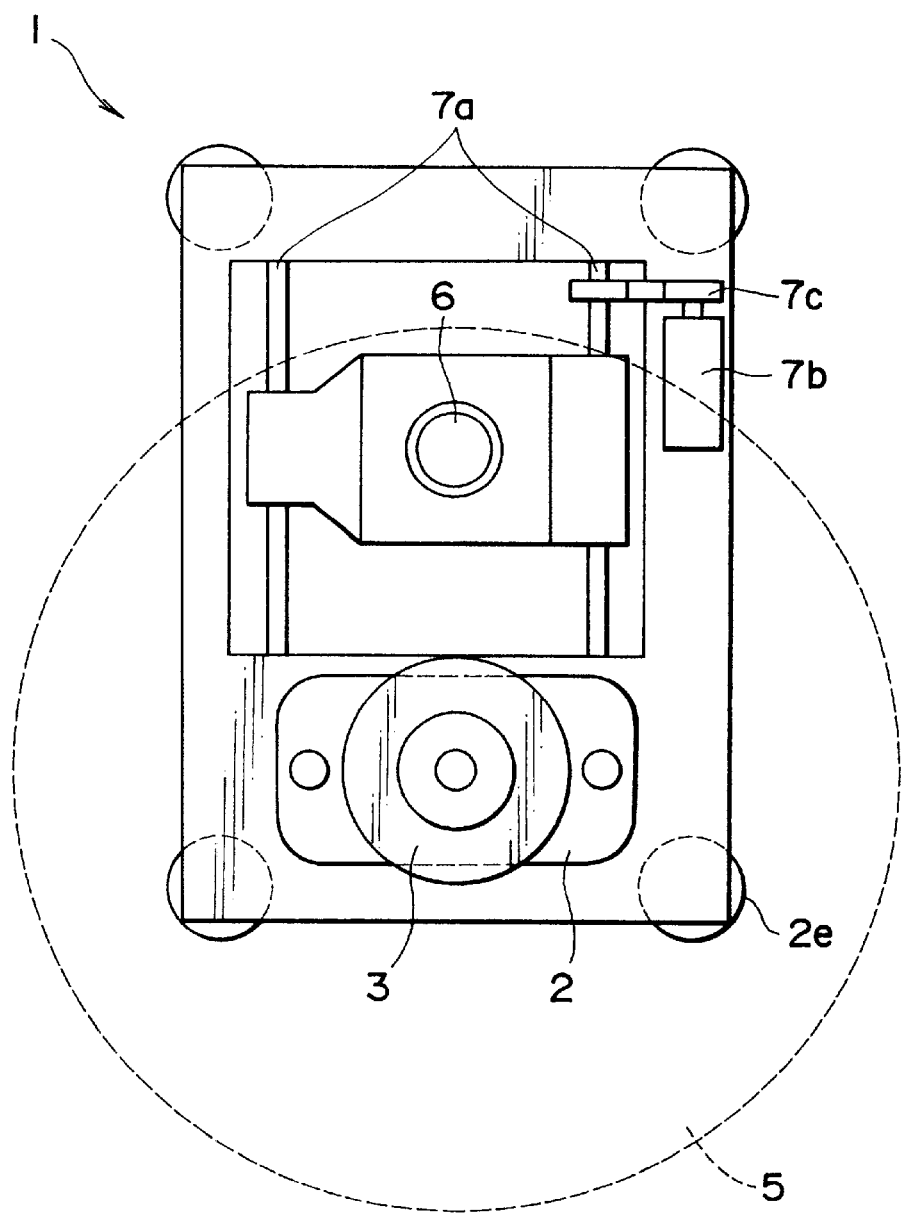

DISK DRIVING APPARATUS FOR RELIABLY CENTERING A METER-LAYER OPTICAL DISK ON WHICH INFORMATION IS RECORDED

BACKGROUND OF THE INVENTION

1. Field of the Invention

The present invention relates to a disk driving apparatus for driving a disk into rotation.

2. Description of the Prior Art

In the conventional disk driving apparatus for a disk having a circular-plate shape such as a compact disc (CD), a compact disc read-only memory (CD-ROM) or an optical magnetic disk (MO), in order to read out and write information from and to the circular-plate disk which is referred to hereafter simply as an optical disk, it is necessary to maintain the positional relationship between the optical disk and an optical pickup for implementing the operation to read out and write the information with a high degree of precision. If a positional shift occurs between the optical disk and the optical pickup, it becomes difficult to read out and write information with a high degree of accuracy. This causes problems in a playback operation, for example, the sound quality of a reproduced audio signal and the picture quality of a reproduced video signal deteriorate.

In particular, since the optical disk described above is generally made of compound resin, there are observed relatively big variations in the diameter of the hole provided at the center of the optical disk for facilitating the mounting of the optical disk on a turntable. Thus, a measure for countering these variations and, hence, for suppressing a positional shift, is absolutely required.

An example of such a countermeasure is a centering mechanism of an optical disk which is provided so as to always mount the optical disk at a correct position on the turntable.

An example of an optical-disk playback apparatus with a centering mechanism is shown in FIGS. 5 and 6. FIG. 5 is a diagram roughly showing a side view of the principle components of a conventional optical-disk playback apparatus. FIG. 6 is a diagram roughly showing a plane view of the conventional optical-disk playback apparatus shown in FIG. 5.

As shown in FIGS. 5 and 6, the optical-disk apparatus 1 for playing back information from a CD comprises a spindle motor 2, a turntable 3 and a clamp 4.

The spindle motor 2 comprises a rotor 2a and a stator board 2b which is installed on a chassis 2c by screws 2d.

The chassis 2c is mounted on a main-body frame of the optical-disk apparatus 1 through insulators 2e each made of rubber so as to prevent vibration from being propagated from the spindle motor 2 to the optical disk. It should be noted that the main-body frame itself is not shown in the figure.

The turntable 3 is fixed on the upper end of a rotational shaft 2f of the spindle motor 2 concentrically. An optical disk 5 can be mounted on and removed from the turntable 3 freely.

Formed at the center of the turntable 3 is a circular protrusion 3a used as a horizontal-direction reference for mounting the optical disk 5 with a circular-plate shape on the turntable 3. The optical disk 5 has a circular hole 5a bored through the center thereof. The optical disk 5 is mounted on the turntable 3 with the protrusion 3a inserted through the hole 5a.

The clamp 4 has a circular shape in the horizontal direction. At the center of the lower surface of the clamp 4, a circular dent is formed for accommodating the protrusion 3a of the turntable 3. The clamp 4 is placed above the turntable 3 and the optical disk 5.

At the inner part of the dent of the clamp 4 described above, a magnet 4a is mounted. The magnet 4a is attracted by the upper surface of the protrusion 3a of the turntable 3 so that the lower surface of the circumference of the clamp 4 is pressed against a portion of the optical disk 5 facing the circumference. In this way, the optical disk 5 is sandwiched firmly between the clamp 4 and the turntable 3, being fixed on the turntable 3.

In addition, an optical pickup 6 for reading and writing information from and to the optical disk 5 is mounted slidably in the radial direction of the optical disk 5 along guide axes 7a installed on the chassis 2c as shown in FIG. 6. The optical pickup is driven by a sled motor 7b through a sled gear 7c into sliding motion in the radial direction.

A centering mechanism for the optical disk 5 is provided on the protrusion 3a of the turntable 3. The centering mechanism has a configuration shown in FIGS. 7 and 8. FIG. 7 is a diagram showing, in an enlarged form, a cross section of the protrusion 3a at the center of the turntable 3 employed in the optical-disk playback apparatus shown in FIG. 5. FIG. 8 is a diagram showing partially, in an enlarged form, the centering mechanism of the optical disk 5 on the turntable 3.

As shown in FIGS. 7 and 8, the protrusion 3a at the center of the turntable 3 includes a base 8a, a ring 8b, a coil spring 8c and a chalking yoke 8d.

The base 8a is created at the center of the turntable 3 to enclose a bearing pressed against the rotational shaft 2f of the spindle motor 2. The base 8a is engaged with and fixed to the bearing. The coil spring 8c is engaged with the base 8a and the ring 8b is engaged with the coil spring 8c from a position above the coil spring 8c.

On the upper edge of the base 8a, the chalking yoke 8d having a ring-like shape is provided for attracting the magnet 4a of the clamp 4. In the embodiment shown in the figures, the chalking yoke 8d is created to form a single body with the base 8a.

The chalking yoke 8d has an inner diameter smaller than the outer diameter of the ring 8b and a circumferential edge bent downward along the entire circumference thereof.

The inner diameter of the ring 8b is made slightly larger than the outer diameter of the base 8a by such a difference that the ring 8b can be moved up and down relatively to the base 8a with the inner circumferential surface of the ring 8b sliding over the outer circumferential surface of the base 8a with no backlash with respect to the base 8a.

The outer surface of the ring 8b is inclined downward on the outer side in the radial direction thereof. That is to say, the ring 8b has a conical shape which has a minimum outer diameter and a maximum outer diameter on the top and bottom surfaces thereof respectively.

In addition, the ring 8b is created so that the outer diameter at a middle position between the top and bottom surfaces thereof is about equal to the diameter of the circular hole 5a bored through the center of the optical disk 5 to be mounted.

On the lower surface of the ring 8b, a continuous groove having a ring shape is created in the circumferential direction. The upper end of the coil spring 8c is plugged into the groove.

Thus, by bringing the upper end of the coil spring 8c into contact with the inner part of the groove, the ring 8b is pressed by the coil spring 8c in the upward direction.

Here, the upper limit of the position of the ring 8b is determined when the upper surface of the ring 8b comes in contact with the lower edge of the bent circumference of the chalking yoke 8d. When no optical disk 5 is mounted, the ring 8b is held at the upper limit of the position by the tension of the coil spring 8c.

When an optical disk 5 is mounted on the turntable 3 having a centering mechanism with such a configuration, first of all, the lower edge of the hole 5a of the optical disk 5 is brought into contact with a circumferential portion of the ring 8b in close proximity to the middle between the top and bottom circumferential surfaces of the ring 8b as shown in FIG. 8. The ring 8b is pulled downward by the weight of the optical disk 5, resisting the tension of the coil spring 8c.

Later on, as the clamp 4 is engaged with the protrusion 3a of the turntable 3 as described above, the magnet 4a of the clamp 4 is attracted by the chalking yoke 8d. In this way, the optical disk 5 is further pulled by a pressure generated by the chalking yoke 8d in the downward direction along with the ring 8b. As a result, the lower surface of the optical disk 5 is brought into contact with the upper surface of the turntable 3, being firmly held on the turntable 3.

In this way, by providing the ring 8b with an outer surface having a conical shape that can be slided up and down under the pressure of the tension generated by the coil spring 8c, any variations in diameter of the hole 5a bored at the center of the optical disk 5 are absorbed by the up-and-down movement of the spring 8b when the optical disk 5 is mounted on the turntable 3, making it possible to prevent the optical disk 5 from being mounted on the turntable 3 in an eccentric state with a high degree of reliability.

In the turntable 3 having a centering mechanism with a configuration described above, however, a play margin between the ring 8b and the base 8a is required so as to allow the ring 8b to be slided up and down with respect to the base 8a. Unfortunately, a shift is inadvertently result may between the centers of the ring 8b and the base 8a, that is, between the centers of the optical disk 5 and the turntable 3. The shift between the centers becomes a cause of deterioration of the accuracy and the characteristics of the operations to read out and write information by the optical pickup 6.

In addition, since a space for allowing the ring 8b to be slided up and down is required, as a whole, the height of the turntable 3 increases, giving rise to a problem caused by the fact that the increase in height of the turntable 3 is disadvantageous to the effort to make the entire optical-disk apparatus compact and thin.

Moreover, since the optical disk 5 mounted on the turntable 3 is always pressed in the upward direction by the tension of the coil spring 8c through the ring 8b, the chalking force of the magnet 4a is weakened. Thus, in order to avoid a slip between the optical disk 5 and the turntable 3, it is necessary to employ a strong magnet 4a. As a result, the magnet 4a itself becomes large in size and expensive, opposing the attempt to make the entire optical-disk apparatus small in size and have a low cost.

Furthermore, since the ring 8b and the coil spring 8c are required in the centering mechanism of the optical disk 5, the number of components increases, raising the component and assembly costs as well as lengthening the time it takes to assemble the components. As a result, such a centering mechanism becomes the cause of a decrease in production efficiency.

Further, in recent years, a multilayered optical disk for high-density recording applications such as disks stuck to each other like the ones shown in FIG. 9 is under development. FIG. 9 is a diagram showing cross sections of the main components composing a multi-disk set. As an example, a DVD (a digital versatile disk) is explained as follows.

In the example shown in FIG. 9, two optical-disk plates 9a and 9b are stuck by adhesive to each other to form a multi-disk set 9. As shown in the figure, the optical-disk plates 9a and 9b which overlap each other have holes 9a1 and 9b1 respectively bored through the centers thereof. The holes 9a1 and 9b1 have a typical diameter of 15 mm.

According to the specifications of the DVD, as a standalone optical-disk plate, the allowable range of shifts in inner diameter of the optical-disk plates 9a and 9b is +0.15 mm to −0 mm. After they are stuck to each other, however, the inner diameter of the hole must be at least 15 mm. Thus, in a worst case, the multi-disk set 9 has a maximum shift allowable by the specifications shown in FIG. 10. FIG. 10 is a diagram showing cross sections of optical-disk plates of a multi-disk set which are shifted from each other by a maximum allowable distance. As shown in the figure, the optical-disk plates 9a and 9b with holes 9a1 and 9b1 respectively both have an inner diameter of 15.15 mm and are stuck to each other in a state with the optical-disk plates 9a and 9b shifted from each other in mutually opposing directions.

Thus, in an actually produced multi-disk set 9, in general, the holes 9a1 and 9b1 of the optical-disk plates 9a and 9b are shifted slightly from each other as shown in FIG. 11. FIG. 11 is a diagram showing cross sections of optical-disk plates of a multi-disk set which are shifted from each other by a typical distance. When the centering mechanism described above is applied to such a multi-disk set, the holes 9a1 and 9b1 of the optical-disk plates 9a and 9b which should each serve as a standard of centering are shifted to each other, giving rise to a problem that centering can not be accomplished with a high degree of accuracy.

SUMMARY OF THE INVENTION

Addressing the problems described above, it is thus an object of the present invention to provide a disk driving apparatus which has a simple configuration requiring a low cost to build and is capable of accomplishing centering with a high degree of accuracy even if a multi-disk set is used.

In order to achieve the object described above, the present invention provides a disk driving apparatus comprising:

a motor;

a turntable mounted on the rotational shaft of the motor, the turntable being used for mounting and driving into rotation a multi-disk set comprising a plurality of disk plates stuck to each other; and a disk holding mechanism comprising a fixed portion with such a height that only a particular one of the disk plates of the multi-disk set to be mounted on the turntable is brought into contact with the fixed portion, and a movable portion capable of moving in the radial direction of the turntable in contact with said particular disk plate.

According to the configuration described above, when a multi-disk set is mounted on the turntable, the inner edge of the hole of the disk is brought into contact with the fixed and movable portions and, while resisting the tensions of the movable portions, the movable portions are pushed centripetally in the radial direction, bringing the multi-disk set into contact with the upper surface of the turntable.

At that time, the fixed and movable portions located on sides opposing to each other with respect to the center of the turntable are engaged with the disk and one of the optical-disk plates constituting the multi-disk set is pushed by the tensions exercised by the movable portions away from the center of the turntable in the centrifugal direction, causing the optical-disk plate to come in contact with the outer circumferential surfaces the fixed portions.

As a result, the multi-disk set is centered at the center of the turntable with a high degree of accuracy with the optical-disk plate taken as a reference.

BRIEF DESCRIPTION OF THE DRAWINGS

An embodiment of the present invention will be described in detail with reference to the following figures wherein:

FIG. 6 is a diagram roughly showing a plane view of the conventional compact-disc playback apparatus shown in FIG. 5;

DETAILED DESCRIPTION OF THE PREFERRED EMBODIMENT

The present invention will become more apparent from a study of the following detailed description of a preferred embodiment with reference to the accompanying diagrams of FIGS. 1 to 4.

It should be noted that the following description merely explains a preferred embodiment of the present invention on which a variety of technologically desirable limitations are imposed, the description is not to be construed in a limiting sense. That is to say, the scope of the present invention is not limited to the preferred embodiment.

Figure 1:
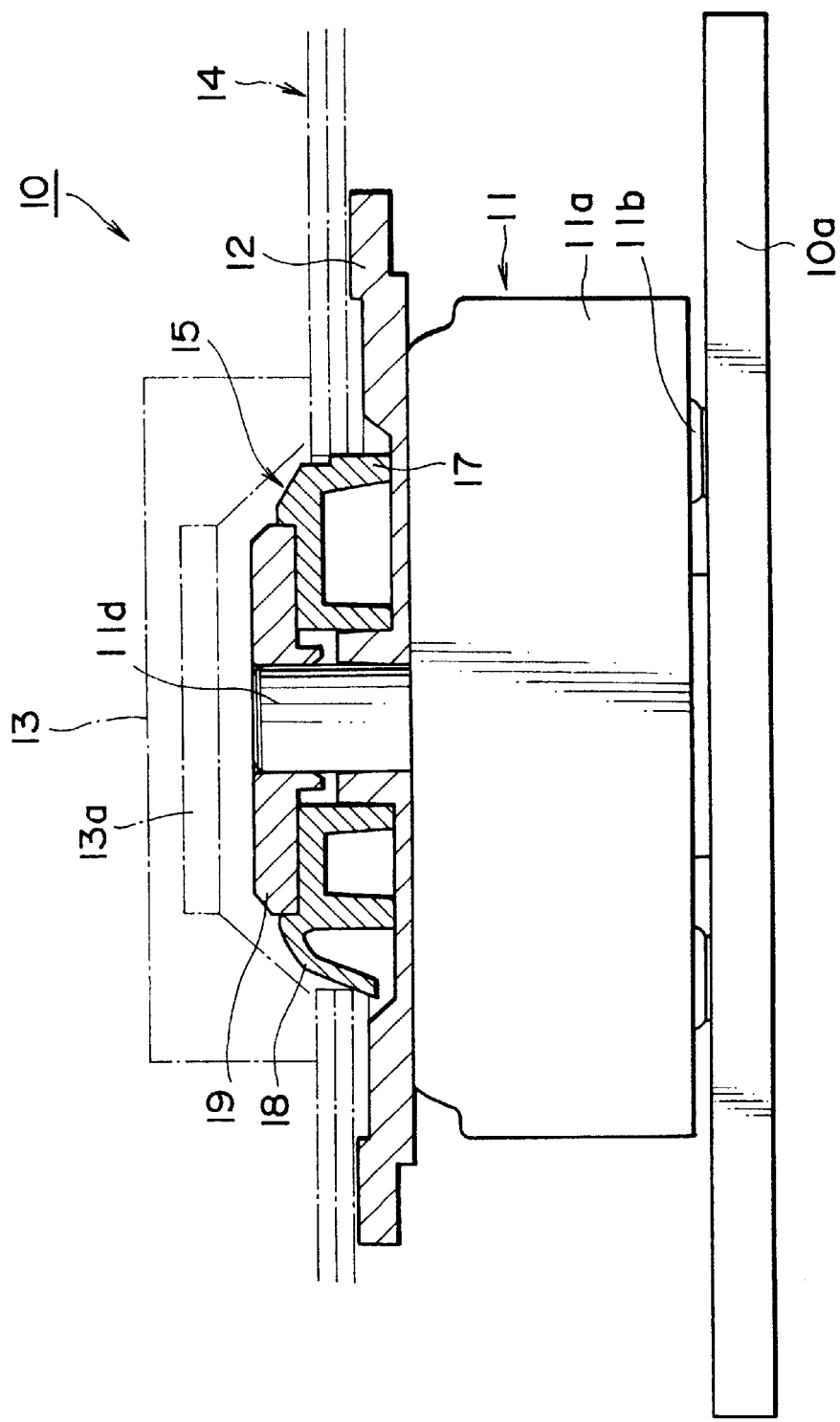
FIG. 1 is a diagram showing an embodiment implementing a disk driving apparatus provided by the present invention.

FIG. 1 is a diagram showing an embodiment implementing a disk driving apparatus 10 provided by the present invention.

The disk driving apparatus 10 is an optical-disk playback apparatus for reproducing a signal from typically a multi-disk set. As shown in the figure, the disk driving apparatus 10 comprises a spindle motor 11, a turntable 12 and a clamp 13.

Figure 5:
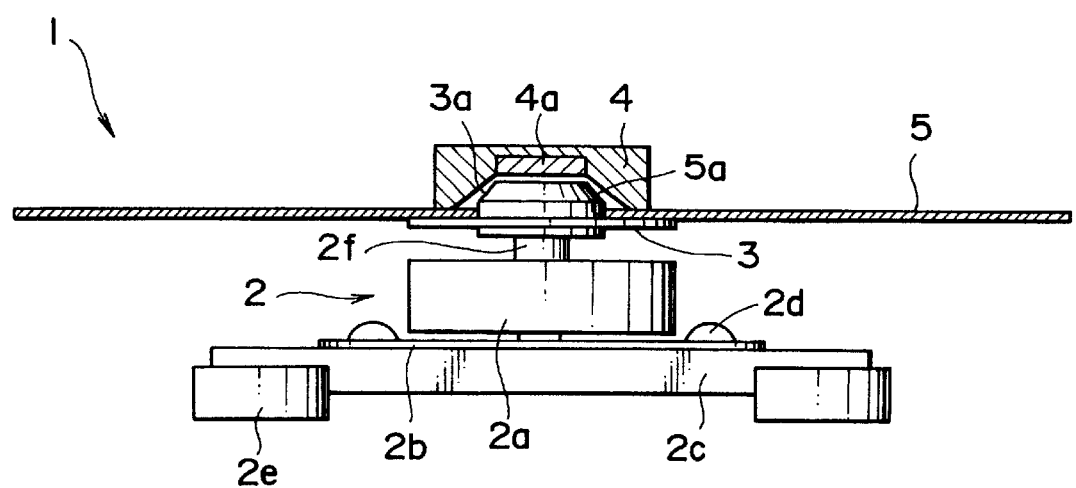
FIG. 5 is a diagram roughly showing a side view of principal components of the conventional compact-disc playback apparatus.
Figure 7:
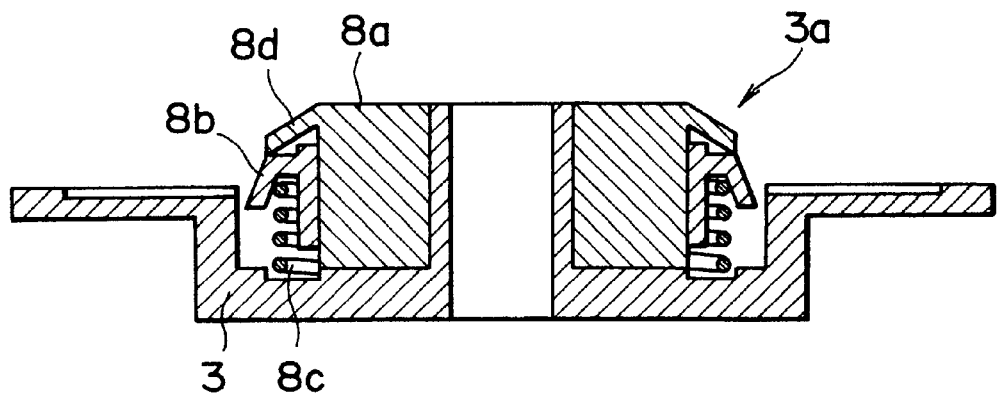
FIG. 7 is a diagram showing, in an enlarged form, a cross section of a protrusion at the center of a turntable employed in the compact-disc playback apparatus shown in FIG. 5.
Figure 8:
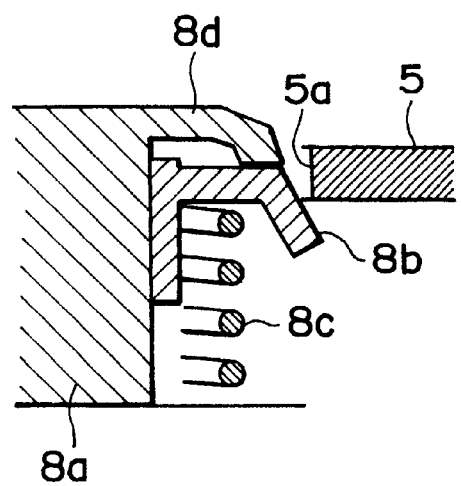
FIG. 8 is a diagram showing partially, in an enlarged form, the centering mechanism of the optical disk on the turntable 3 shown in FIG. 7.
Figure 9:
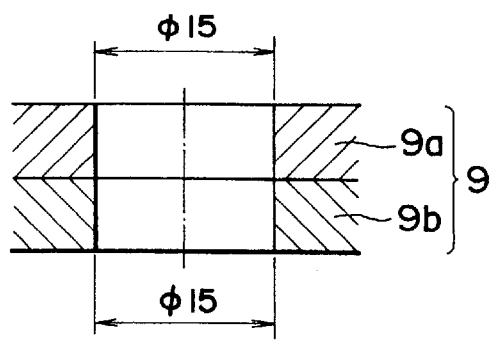
FIG. 9 is a diagram showing a cross section of main components composing a stuck-disk set.

The spindle motor 11 has a commonly known configuration such as the configuration of the spindle motor 2 shown in FIG. 5.

A chassis 11a of the spindle motor 11 is mounted on a main-body frame 10a of the optical-disk apparatus 10 through insulators 11b, i.e., shock absorbers each made of rubber so as to prevent vibration from being propagated from the spindle motor 11 to the optical disk.

The turntable 12 is fixed on the upper end of a rotational shaft 11d of the spindle motor 11 concentrically. An optical disk 14 can be mounted on and removed from the turntable 12 freely.

Formed at the center of the turntable 12 is a circular protrusion 15 used as a horizontal-direction reference for mounting an optical disk 14 with a circular-plate shape on the turntable 12. The optical disk 14 has a circular hole bored through the center thereof. The optical disk 14 is mounted on the turntable 12 with the protrusion 15 inserted through the hole as shown in FIG. 1.

The clamp 13 has a commonly known structure like the clamp 4 shown in FIG. 5.

Much like the clamp 4, at the inner part of the dent of the clamp 13, a magnet 13a is mounted. The magnet 13a is attracted by the upper surface of the protrusion 15 of the turntable 12 so that the lower surface of the circumference of the clamp 13 is pressed against a portion of the optical disk 14 facing the circumference. In this way, the optical disk 14 is sandwiched firmly between the clamp 13 and the turntable 12, being fixed on the turntable 12.

In addition, an optical pickup for reading out and writing information from and to the optical disk 14 is mounted slidably in the radial direction of the optical disk 14 in the chassis 11a. It should be noted that the optical pickup itself is not shown in the figure. The optical pickup is driven by a driving mechanism also not shown in the figure into sliding motion in the radial direction.

Figure 2:
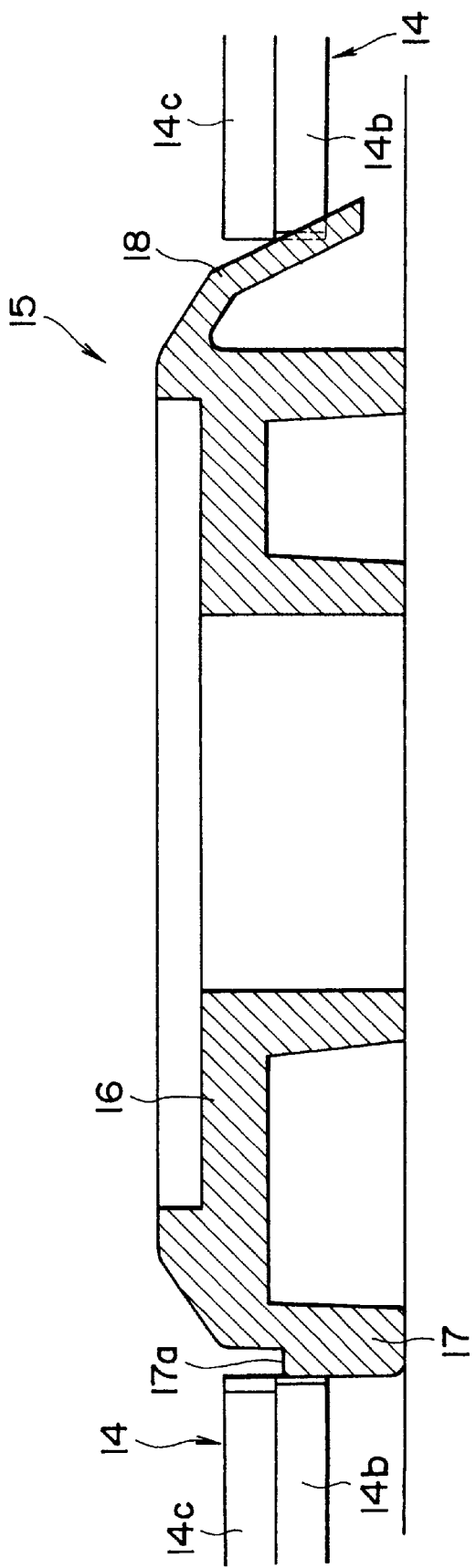
FIG. 2 is a diagram showing, in an enlarged form, a cross section of a protrusion at the center of a turntable employed in the disk driving apparatus shown in FIG. 1.

A centering mechanism for the optical disk 14 is provided on the protrusion 15 of the turntable 12. The centering mechanism has a configuration shown in FIGS. 2 and 3. FIG. 2 is a diagram showing, in an enlarged form, a cross section of the protrusion 15 at the center of the turntable 12 employed in the optical-disk playback apparatus shown in FIG. 1 and FIG. 3 is a diagram showing a plane view of the protrusion 15 of the turntable 12.

Figure 3:
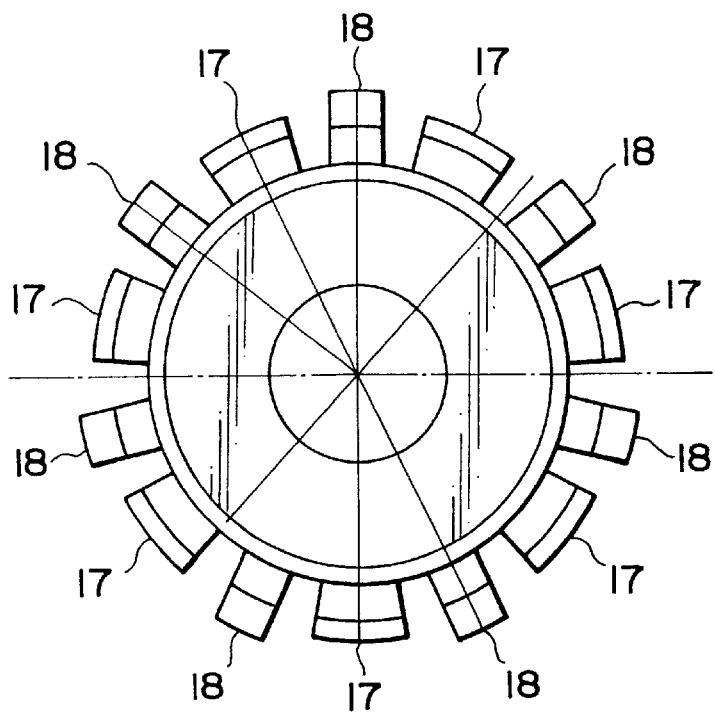
FIG. 3 is a diagram showing a plane view of the protrusion of the turntable shown in FIG. 2.

As shown in FIGS. 2 and 3, the protrusion 15 at the center of the turntable 12 includes a base 16, fixed portions 17, movable portions 18 and a chalking yoke 19.

The base 16 has a shape almost resembling a cylinder firmly held on the rotational shaft 1id of the spindle motor 11 directly or indirectly. In the embodiment shown FIG. 1, the base 16 is attached to the rotational shaft 11d indirectly through the turntable 12.

The chalking yoke 19 is provided on the upper end of the base 16 so that the attracting force of the magnet 13a employed in the clamp 13 can be utilized effectively to attract the upper surface of the protrusion 15.

As shown in FIG. 3, at least three fixed portions 17 are arranged at equal angular intervals around the center of the upper surface of the turntable 13 to form a ring facing an inner circumference of the hole 14 in the disk with a fabrication diameter of typically 15 mm above the center of the turntable 13. It should be noted that, as described above, the hole is bored through the center of the optical disk 14, i.e., a multi-disk set comprising two optical-disk plates 14b and 14c, to be mounted on the turntable 12. In the example shown in FIG. 3, seven fixed portions 17 are provided.

Figure 10:
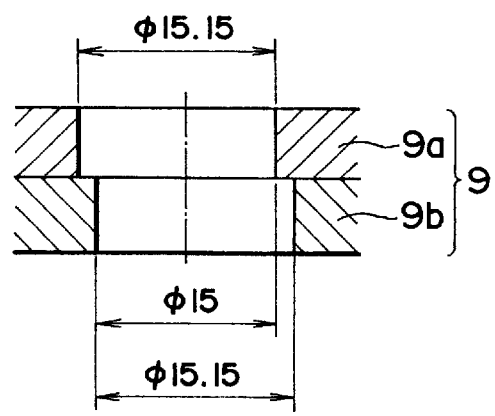
FIG. 10 is a diagram showing a cross section of optical-disk plates of a stuck-disk set which are shifted from each other by a maximum allowable distance.
Figure 11:
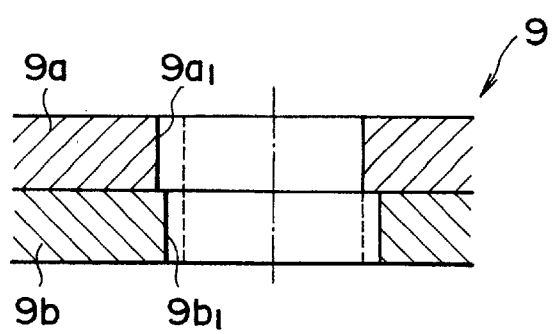
FIG. 11 is a diagram showing a cross section of optical-disk plates of a stuck-disk set which are shifted from each other by a typical distance.

In addition, as shown on the left end of FIG. 2, each of the fixed portions 17 is provided with a step 17a with the upper surface thereof is placed at the about the same level as the optical-disk plate 14b, the lower optical-disk plate of the multi-disk set 14. In this way, the fixed portion 17 is brought into contact with only the lower optical-disk plate 14b even in the case of a multi-disk set with a maximum shift shown in FIG. 10.

Furthermore, the upper edge of the fixed portion 17 is slanting downward on the outer side in the radial direction thereof.

On the other hand, the movable portions 18 are located on the opposite sides to the fixed portions 17 with respect to the center of the turntable 12 as shown in FIG. 3. Protruding out off the upper end of the circumference of the base 16, each of the movable portions 18 can be deformed elastically in the radial direction.

Much like the fixed portion 17, the movable portion 18 can come in contact only with the lower optical-disk plate 14b without coming in contact with the upper optical-disk plate 14c of the multi-disk set 14 as shown on the right end of FIG. 2. This is true even if the optical-disk plates 14b and 14c are stuck to each other with the fabrication maximum inner diameter shift as in the case shown in FIG. 10.

Figure 4:
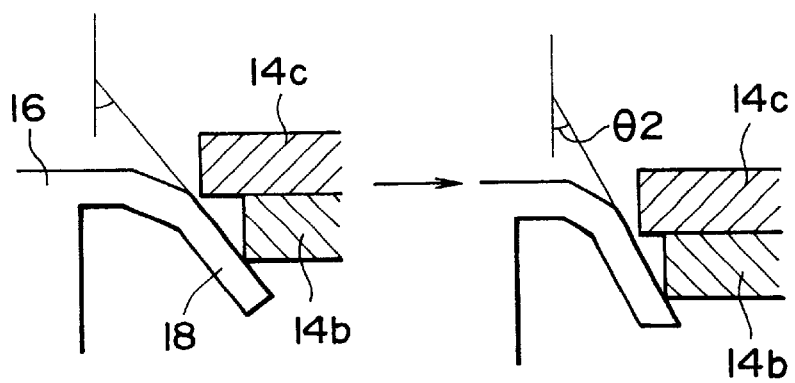
FIG. 4 is a diagram partially showing, in enlarged forms, the cross section of a movable portion before and after the optical disk is pulled down toward the turntable shown in FIG. 2.

Much like the fixed portion 17, the upper edge of the movable portion 18 is slanting downward on the outer side in the radial direction thereof. It is desirable to form the movable portion 18 with a two-stage taper angle which makes insertion into the hole of the optical disk 14 easy as shown in FIG. 4. FIG. 4 is a diagram partially showing, in enlarged forms, the cross section of the movable portion 18 before and after the optical disk 18 is pulled down toward the turntable 12. A taper angle THETA2 in close proximity to the edge is selected such that, with the optical disk 14 mounted on the turntable 12, the taper angle THETA2 is set at 20 degrees for example.

The disk driving apparatus 10 implemented by the embodiment of the present invention has the configuration described above wherein, when a multi-disk set 14 is mounted on the turntable 12, first of all, the lower edge of the hole of the multi-optical disk 14 is brought into contact with the fixed portions 17 of the protrusion 15 and the taper parts of the movable portions 18 of the protrusion 15, and then the multi-disk set 14 is pulled downward by the weight of the multi-disk set 14 itself, resisting the tensions of the movable portions 18.

Later on, as the clamp 13 is engaged with the protrusion 15 of the turntable 12 as described above, the magnet 13a of the clamp 13 is attracted by the chalking yoke 19. In this way, the optical disk 14 is further pulled by a pressure generated by the chalking yoke 19 in the downward direction. As a result, the lower surface of the optical disk 14 is brought into contact with the upper surface of the turntable 12, being firmly held on the turntable 12.

At that time, the hole of the lower optical-disk plate 14b of the multi-disk set 14 deforms the movable portions 18 in the radial direction toward the center of the turntable 12. While being resisted by the tensions of the movable portions 18 in the centrifugal direction, the hole of the lower optical-disk plate 14b comes in contact with the outer circumferential surfaces the fixed portions 17 on the sides opposite to the movable portions 18 with respect to the center of the turntable 12.

In this way, the lower optical-disk plate 14b of the multi-disk set 14 is centered on the turntable 12 with the hole thereof taken as a reference. Thus, when the multi-disk set 14 is mounted on the turntable 12, the multi-disk set 14 is centered with the hole of the lower optical-disk plate 14b thereof taken as a reference even if some variations in diameter of the hole of the multi-disk set 14 exist, resulting in a shift in position when the upper and lower optical-disk plates 14b and 14c are stuck to each other. This is because the variations are absorbed by the deformation of the movable portions 18 which prevents the multi-disk set 14 from being mounted on the turntable 12 in an eccentric state with a high degree of reliability.

In addition, since the centering mechanism, that is, the fixed and movable portions 17 and 18, does not include a component moving up and down like the spring 8b employed by the conventional centering mechanism, the space for the up-and-down movement is not required. Thus, the height of the turntable 12 as a whole can be reduced, making it possible to make the entire disk driving apparatus small in size and thin with ease.

Moreover, since the only components for centering the optical disk 14 are the fixed and movable portions 17 and 18 which can be formed as integrated parts of the base 16 of the turntable 12, the number of required components to make the centering function work is small. As a result, the component and assembly costs can be reduced and, at the same time, the time it takes to assemble the components can be shortened, allowing the production efficiency to be increased.

It should be noted that, while the present invention has been explained with reference to a preferred embodiment wherein the number of fixed portions 17 and the number of movable portions 18 are each set at seven, the description is not to be construed in a limiting sense. The number of pairs of fixed and movable portions can be set at any number equal to or greater than three as long as the fixed and movable portions forming a pair are located on sides opposing to each other with respect to the center of the turntable 12.

As described, according to the embodiment of the present invention, when a multi-disk set 14 is mounted on the turntable 12, first of all, the lower edge of the hole of the stuck-optical disk 14 is brought into contact with the fixed portions 17 of the protrusion 15 and the taper parts of the movable portions 18 of the protrusion 15 and, while being resisted by the tensions of the movable portions 18 in the centrifugal direction, the hole of the lower optical-disk plate 14b deforms the movable portions 18 in the radial direction toward the center of the turntable 12. As a result, the lower surface of the optical disk 14 is brought into contact with the upper surface of the turntable 12.

At that time, the fixed and movable portions 17 and 18 located on sides opposing to each other with respect to the center of the turntable 12 are engaged with the hole bored through the center of the multi-disk set 14, and the inner wall of the hole of the lower optical-disk plate 14b constituting the multi-disk set 14 is pushed by the tensions exercised by the movable portions 18 away from the center of the turntable 12 in the centrifugal direction, causing the inner wall of the hole of the lower optical-disk plate 14b to come in contact with the outer circumferential surfaces of the fixed portions 17 on the sides opposite to the movable portions 18 with respect to the center of the turntable 12.

As a result, the multi-disk set 14 can be centered with respect to the rotational center of the turntable 12 with a high degree of accuracy with the hole of the lower optical-disk plate 14*b* thereof taken as a reference even if there are variations in hole diameter.

As described above, according to the present invention, it is possible to provide a disk driving apparatus capable of centering not only an optical disk, but also a multi-disk set with a high degree of accuracy by means of a simple configuration implementable at a low cost.

What is claimed is:

1. A disk driving apparatus comprising:
   a motor for rotating a rotational shaft;
   a turntable mounted on the rotational shaft of said motor, said turntable used for mounting and driving into rotation a multi-disk set comprising a plurality of disk plates stuck to each other; and
   a disk centering mechanism comprising;
      a fixed member with upper and lower side surfaces separated by a step portion, said step portion being disposed so as to be in a center hole of said multi-disk set when said multi-disk set is mounted on said turntable such that only said lower side surface of said fixed member contacts said multi-disk set when mounted on said turntable, and
      a flexible member for contacting and supporting said multi-disk set, said flexible member bending in a radial direction of said turntable when said multi-disk set is mounted on said turntable.

2. The apparatus of claim 1, wherein said fixed member and said flexible member are aligned opposite each other on opposite sides of said rotational shaft.

3. The apparatus of claim 1, wherein said disk centering mechanism comprises a plurality of fixed members and a corresponding plurality of flexible members disposed in a circle around said rotational shaft, wherein each fixed member is paired with a flexible member and aligned opposite that flexible member with respect to said rotational shaft.

4. The apparatus of claim 1, wherein said flexible member is tapered outward with respect to said rotational shaft in a downward direction.

5. The apparatus of claim 4, wherein:
   said turntable comprises a lower inner portion and an elevated outer portion separated by a step portion; and
   said tapered flexible member extends below said elevated outer portion of said turntable from above said turntable.

6. The apparatus of claim 1, wherein said flexible member is arranged so as to only contact a bottom plate of said plurality of disk plates when said multi-disk set is mounted on said turntable.

7. The apparatus of claim 1, wherein said fixed member and said flexible member are integrally formed on a base member of said disk centering mechanism, said base member being disposed on said turntable with said rotational shaft extending through said a central hole in said base member.

8. A disk driving apparatus comprising:
   a motor for rotating a rotational shaft;
   a turntable mounted on the rotational shaft of said motor, said turntable used for mounting and driving into rotation a multi-disk set comprising a plurality of disk plates stuck to each other; and
   a disk centering mechanism comprising;
      a fixed member with upper and lower side surfaces separated by a step portion, said step portion being disposed so as to be in a center hole of said multi-disk set when said multi-disk set is mounted on said turntable such that only said lower side surface of said fixed member contacts said multi-disk set when mounted on said turntable, and
      a flexible member for contacting and supporting said multi-disk set, said flexible member bending in a radial direction of said turntable when said multi-disk set is mounted on said turntable,
   wherein said fixed member further comprises an upper sloped surface above said upper side surface, wherein said upper sloped surface is tapered outward with respect to said rotational shaft in a downward direction.

9. A disk driving apparatus comprising:
   a turntable for mounting and rotating a multi-disk set comprising a plurality of disk plates stuck to each other; and
   a disk centering mechanism comprising;
      a fixed member, and
      a flexible member, aligned opposite said fixed member, for contacting and supporting said multi-disk set, said flexible member bending in a radial direction of said turntable when said multi-disk set is mounted on said turntable,
   wherein said fixed member comprises upper and lower side surfaces separated by a step portion, said step portion being disposed so as to be in a center hole of said multi-disk set when said multi-disk set is mounted on said turntable such that only said lower side surface of said fixed member contacts said multi-disk set when mounted on said turntable,
   wherein said fixed member further comprises an upper sloped surface above said upper side surface, wherein said upper sloped surface is tapered outward with respect to said rotational shaft in a downward direction.

* * * * *

UNITED STATES PATENT AND TRADEMARK OFFICE
CERTIFICATE OF CORRECTION

PATENT NO. : 6,205,111 B1  Page 1 of 1
DATED : March 20, 2001
INVENTOR(S) : Tatsuro Hayakawa It is certified that error appears in the above-identified patent and that said Letters Patent is hereby corrected as shown below:

<u>Title page,</u>
The title should read:
-- [54] DISK DRIVING APPARATUS FOR RELIABLY CENTERING A MULTI-LAYER OPTICAL DISK ON WHICH INFORMATION IS RECORDED --

<u>Column 10, claim 7,</u>
Line 3, delete the word "a".

Signed and Sealed this

Second Day of April, 2002

*Attest:*

*Attesting Officer*

JAMES E. ROGAN
*Director of the United States Patent and Trademark Office*